United States Patent [19]

Araki et al.

[11] Patent Number: 4,481,776
[45] Date of Patent: Nov. 13, 1984

[54] COMBINED VALVE

[75] Inventors: Tutomu Araki; Hidesumi Kuwashima, both of Hitachi, Japan

[73] Assignee: Hitachi, Ltd., Tokyo, Japan

[21] Appl. No.: 325,869

[22] Filed: Nov. 30, 1981

[30] Foreign Application Priority Data

Dec. 2, 1980 [JP] Japan ................................ 55-169091
Jan. 21, 1981 [JP] Japan .................................... 56-6336

[51] Int. Cl.³ .......................... F01K 13/02; F16K 1/00
[52] U.S. Cl. ................................. 60/660; 137/630.14; 137/630.15; 137/614.19
[58] Field of Search .............. 137/613, 614.19, 630.14, 137/630.15; 60/660

[56] References Cited

U.S. PATENT DOCUMENTS 2,333,455 11/1943 Warren ...................... 137/630.14 X
3,809,126 5/1974 Oberle ........................... 137/630.14
3,978,889 9/1976 Kameda et al. ................ 137/630.14
4,114,651 9/1978 Oberle ........................... 137/630.14
4,114,652 9/1978 Oberle ........................... 137/630.14
4,121,617 10/1978 Masek et al. ................... 137/630.14
4,384,593 5/1983 Keller ............................. 137/630.15

FOREIGN PATENT DOCUMENTS 46-14487 4/1971 Japan ............................. 137/630.14
47-20891 6/1972 Japan ............................. 137/630.15

Primary Examiner—Martin P. Schwadron
Assistant Examiner—John A. Rivell
Attorney, Agent, or Firm—Antonelli, Terry & Wands

[57] ABSTRACT

A combined valve including in combination a stop valve for blocking heating steam introduced into a steam turbine and a control valve assembled in a valve casing in opposed relation. The stop valve is located upstream of the control valve with respect to the stream of the heating steam, and the stop valve and the control valve are each formed in the valve body of a main valve thereof with a bypass valve for allowing the heating steam to flow therethrough. The arrangement enables steam to flow in a volume necessary for starting the steam turbine and allows the limitations placed on the stop valve in opening same to be eliminated.

5 Claims, 10 Drawing Figures

COMBINED VALVE

BACKGROUND OF THE INVENTION

This invention relates to a combined valve suitable for use in a reheating steam turbine which combines a stop valve with a control valve.

In one type of steam turbine plant, a turbine bypass system is provided to reduce the time required for starting the steam turbine. Startup of a steam turbine is effected by first introducing the reheating steam generated in the reheater of a boiler to a medium pressure turbine through a combined reheating valve which combines a reheating stop valve with an intercepting valve in the same valve casing, to thereby raise the speed of operation of the turbine and apply an initial load. In the turbine startup operation of this system, it is essential that the flow rate of reheating steam be precisely controlled by means of the combined reheating valve. The of an intercepting valve of a large diameter use for effecting control of the flow rate of steam in normal operating condition would make it impossible to effect precise control as desired. Therefore, a proposal has been made to use a combined reheating valve, as described in Japanese Utility Model Application Laid-Open No. 4378/80, which combines a reheating stop valve with a bypass valve for effecting control of a flow rate of low order.

This combined reheating valve is constructed such that an intercepting valve has its head loosely fitted through a seal ring to the inner periphery side of a cylindrical projection of a valve casing to define a chamber therebetween, and a reheating stop valve having a built-in bypass valve is arranged on the lower end of the intercepting valve which is located on the downstream side with respect to the stream of steam.

When the steam turbine is started, reheating steam is introduced through a gap between the seal ring and the intercepting valve into the chamber, to fill the upstream side of the reheating stop valve with the reheating steam through a balance hole formed in the intercepting valve communicating with the chamber. By opening the bypass valve of the reheating stop valve while in this condition, the reheating steam is introduced into the medium pressure turbine and the turbine is started.

However, the combined reheating valve described hereinabove has some disadvantages. One of them is that the flow rate of the reheating steam flowing downwardly at turbine startup is limited, and another disadvantage is that it is necessary to switch the valve operation between the reheating valve and the intercepting valve at turbine startup or, more specifically, to first actuate the reheating stop valve to open the reheating stop valve having the built-in bypass valve and then actuate the intercepting valve for opening the intercepting valve.

The disadvantage that is first mentioned is such that since the intercepting valve is brought to a full close condition at initial stages of turbine startup, the volume of the reheating steam flowing through the gap between the seal ring and the intercepting valve is restricted, so that the steam necessary in the process of turbine startup → increase of turbine operation speed → actuation of turbines in combination (application of an initial load) is not positively provided.

The last mentioned disadvantage is such that when the intercepting valve is first fully opened before the turbine is started, the problem that the steam would be lacking in volume as stated with regard to the first mentioned disadvantage can be eliminated, but it becomes necessary to switch the valve operation to the intercepting valve which effects control of the flow rate of reheating steam during normal operation after the process of turbine startup → increase of turbine operation speed → actuation of turbines in combination (application of an initial load) has been completed. Particularly, since the reheating stop valve is constructed such that it cannot be opened until the pressure differential between the front and the rear of the valve is reduced below a predetermined level as the reheating stop valve serves as a sort of safety valve, it is necessary to adjust the opening of the intercepting valve so as to control the pressure in the front of the reheating stop valve or the pressure at the rear of the intercepting valve by detecting the pressure at the rear of the reheating stop valve when switching of valve operation is effected.

Moreover, when switching of valve operation is effected, it is necessary to bring the area of opening of the bypass valve built in the reheating stop valve into complete coincidence with the area of opening of the intercepting valve that is to be closed. Otherwise, the flow rate of the reheating steam would show a variation and it would become impossible to effect control of the turbine. It would be difficult to carry out valve operation that would satisfy the aforesaid requirement.

SUMMARY OF THE INVENTION

This invention has as its object the provision of a combined valve comprising a stop valve and a control valve in combination which enables steam necessary for starting a steam turbine to be supplied in a desired volume and which eliminates limitations that have hitherto been placed on the operation of the stop valve.

The outstanding characteristic of the invention is that there is provided, in a combined valve comprising in combination a stop valve for blocking heating steam and a control valve for adjusting the flow rate of the heating steam assembled in a valve casing, an improvement residing in that the stop valve is arranged upstream of the control valve with respect to the stream of the heating steam, and that a main valve of the control valve has built therein a bypass valve for allowing the heating steam to flow downwardly therethrough, whereby the heating steam can be made to flow through the combined valve in a desired volume at steam turbine startup.

DESCRIPTION OF THE PREFERRED EMBODIMENT

One embodiment of the combined reheating valve in conformity with the invention will be described by referring to FIGS. 1—4.

A steam turbine plant provided with a turbine bypass system equipped with the combined reheating valve comprising one embodiment of the invention will first be described by referring to FIG. 1.

Figure 1:
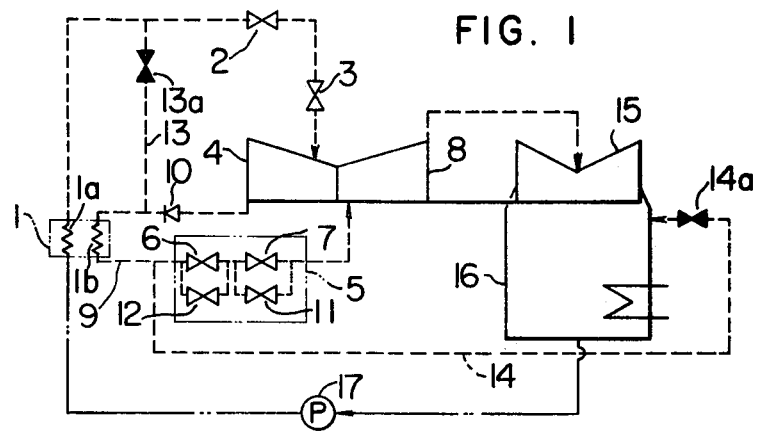
FIG. 1 is a systematic view of a steam turbine plant equipped with the combined reheating valve comprising one embodiment of the invention.

In FIG. 1, the water produced in a condenser 16 by condensation of steam is fed by a feedwater pump 17 to a boiler 1 where it is changed into steam by a heater 1a. With a main steam stop valve 2 being fully closed when the turbine is shutout, the generated steam is prevented from entering a high pressure (hereinafter HP) turbine 4. The steam is introduced, therefore, to a reheater 1b of the boiler 1 through a high pressure bypass system 13 having mounted therein a high pressure (hereinfter HP) bypass valve 13a and via a filter. A check valve 10 is mounted in a main steam system leading from the HP turbine 4 to the reheater 1b, to avoid backflow of steam to the HP turbine 4. With a reheating stop valve (hereinafter RSV) 6 of a combined reheating valve 5 being still fully closed, the reheating steam from the reheater 1b is introduced into the condenser 16 through a low pressure bypass system 14 having mounted therein a low pressure (hereinafter LP) bypass valve 14a, to be changed into water again in the condenser 16. The water produced by condensation of the steam is returned to the boiler 1 in a cycle.

Startup of the steam turbine of the aforesaid construction will now be described. The reheating steam generated in the reheater 1b of the boiler 1 is introduced through the combined reheating valve 5 to an intermediate pressure (hereinafter IP) turbine 8, raising the speed of operation of the turbine and applying an initial load.

Figure 2:
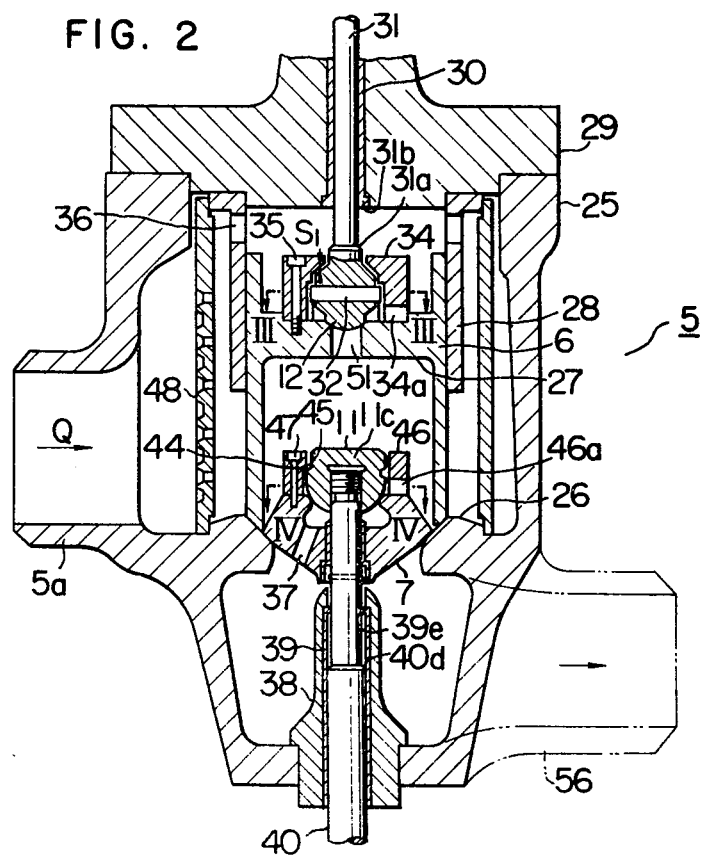
FIG. 2 is a sectional view of the combined reheating valve shown in FIG. 1 which comprises a reheating stop valve and an intercepting valve assembled in combination in a valve casing.

FIG. 2 shows in detail the construction of the combined reheating valve incorporating therein the present invention.

Figure 3:
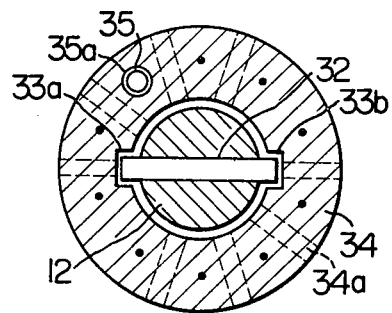
FIG. 3 is a fragmentary sectional view taken along the line III—III in FIG. 2.

In FIG. 2, the combined reheating valve includes the RSV 6 of the upper level located on the upstream side with respect to the stream of steam, and an intercepting valve (hereinafter ICV) 7 of the lower level located on the downstream side thereof, the RSV 6 and the ICV 7 being mounted in a valve casing 25 having an upper cover 29 on its top and formed with a valve seat 26 shared by the RSV 6 and the ICV 7 as a valve seat. The RSV 6 on the upstream side will first be described. The RSV 6 comprises a planar plate portion 27 in the center and is in the form of an elongated cylinder in the up and down direction (or in the form of a letter H in cross section). The RSV 6 also has at its lowermost end surface a seat in contact with the valve seat 26, and is fitted at the outer peripheral surface of the cylinder for sliding movement to the inner peripheral surface of a guide cylinder 28 mounted in the upper cover 29 and formed with a plurality of steam apertures 36 at its uppermost end. This construction is intended to prevent the RSV 6 from wobbling when subjected to the force of steam. The planar plate 27 of the RSV 6 is formed in its central portion with a steam passageway 51, and a valve seat of a spherical daughter valve 12 is provided at the forward end of a valve stem 31 guided by a bush 30 inserted in the upper cover 29. The spherical daughter valve 12 serving as a bypass valve for the RSV 6 has applied thereto from above a cap 34 formed, as shown in FIG. 3, with grooves 33a and 33b for guiding opposite ends of a transversely inserted pin 32, and a bolt receiving opening 35a for inserting a clamping bolt 35 and steam inlet ducts 34a, the cap 34 being clamped to the body of the RSV 6 by the bolt 35. The valve stem 31 is formed with a spherical shoulder 31a in an upper portion of the daughter valve section at the forward end of the valve stem 31.

The ICV 7 located on the downstream side will be described. The ICV 7 which is in the form of a parent valve (ICV) of an outer diameter smaller than the inner diameter of the cylinder of the RSV 6 located on the upstream side has an intercepting bypass valve (hereinafter ICBV) 11 which is a bypass valve screwed to the forward end portion of a valve stem 40 guided by a bush 39 inserted in a packing 38 attached to the lower portion of the valve casing 25 to better control the combined reheating valve.

Figure 4:
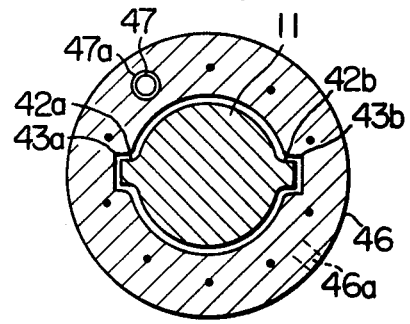
FIG. 4 is a fragmentary sectional view taken along the line IV—IV in FIG. 2.

The ICV 7 has bolted thereto as indicated at 47 a cap 46 formed, as shown in FIG. 4, with grooves 43a and 43b allowing lugs 42a and 42b of the ICBV 11 to slightly move vertically and with a shoulder 45 engaging a shoulder 44 of the ICBV 11 as well as a bolt receiving opening 47a and a steam passageway 46a, to have the ICBV 11 built-in the ICV 7.

The ICV 7 is formed in its body with a steam passageway 37 allowing the reheating steam to flow therethrough.

A steam strainer 48 of a cylindrical shape is mounted at the inner periphery of the valve casing 25 in a manner to surround the RSV 6 and ICV 7.

Operations of various parts of the combined reheating valve of the aforesaid construction that take place at steam turbine startup will now be described.

Referring to FIG. 2, reheating steam Q supplied from the reheater of the boiler flows into the valve casing 25 through a steam inlet 5a located substantially at the intermediate stage thereof and to the outer periphery of the RSV 6 in the closed condition and the outer peripheral portion of the guide cylinder 28 via the steam strainer 48. Thereafter the reheating steam flows into the upper half portion of the RSV 6 after passing through the steam apertures 36 in the guide cylinder 28. The reheating steam thus introduced into the upper half portion of the RSV 6 acts as a force for closing the RSV 6 to provide an excellent seal between the valve seat 26 and the RSV 6 at the time the latter is fully closed. When the diameter of the interfitting portions of the RSV 6 and the guide cylinder 28, the diameter of the valve stem 31, and the force of the steam are denoted by $d_1$, $d_2$ and P respectively, the force of steam F acting on the RSV 6 can be expressed by the equation $F = \pi/4(d_1^2 - d_2^2) \times P$ which acts as a steam force for closing the RSV 6.

The RSV 6 is opened as follows. The valve stem 31 is first lifted by a hydraulic cylinder, not shown, for actuating the RSV 6, to lift the daughter valve 12 at the forward end of the valve stem 31 acting as a bypass valve until the spherical shoulder in the upper portion of the daughter valve portion is brought into contact with the shoulder of the cap 34. That is, this is the stroke $S_1$ of the daughter valve 12 and the RSV 6 is opened at the end of this stroke. The reheating steam disposed in the upper portion of the RSV 6 above the gap of the stroke $S_1$ flows through the steam passageway 51 into the lower chamber to raise the pressure therein, so that balance can be maintained. At this time, the ICV 7 and ICBV 11 are both in the fully closed position. This makes it possible to ignore the steam reaction acting on the RSV 6 when the force for lifting the valve stem 31 to open the RSV 6 is calculated, so that the steam force obtained by multiplying the steam pressure by the diameter of the seat of the daughter valve 12 and the area of the valve stem 31 can open the RSV 6. Thus it is possible to open the RSV 6 by using a hydraulic cylinder, not shown, of low capacity. Also, in opening the RSV 6, the valve stem 31 is lifted until a back seat 31a in the upper portion of the daughter valve 12 near the forward end of the valve stem 31 is brought into contact with a back seat 31b in the lower portion of the bush 30, to bring the RSV 6 to a fully open position. When the RSV 6 is in this position, leaking of the reheating steam through the gap between the valve stem 31 and the bush 30 to the atmosphere can be effectively prevented.

The RSV 6 should be capable of being brought to a fully closed position instantaneously (in about 0.3 sec) in case of an emergency involving the turbine. Thus when the RSV moves a full stroke from the fully open position to the fully closed position, a sort of vacuum would occur in the guide cylinder 28 and interfere with the closing operation of the RSV 6. To avoid this accident, steam inlet apertures 36 are formed in the upper portion of the guide cylinder 28. By opening the RSV 6 as described hereinabove, the reheating steam flows into the head portion of the ICV 7 through a gap between the lowermost end portion of the RSV 6 and the valve seat 26.

Operation of the ICV 7 will now be described.

First of all, the valve stem 40 coupled to a hydraulic cylinder, not shown, is brought into contact at its forward end with the ICBV 11 in a portion 11C and pushed upwardly so as to slightly open the ICBV 11 and allow the reheating steam to flow through the steam passageway 46a in the cap 46 and the steam passageway 37 in the ICV 7 into the lower chamber. The reheating steam thus introduced into the lower chamber of the ICV 7 flows into the chamber of the IP turbine 8 described by referring to FIG. 1, to start the steam turbine. The ICBV 11 has a relatively small diameter, so that it is possible to effect fine control commensurate with the rate of increase in the operation speed of the steam turbine.

When the end of increasing the operation speed of the steam turbine is attained by means of the ICBV 11 and the desired load is reached, one has only to open the ICV 7 which is the parent valve. This can be achieved by pushing the valve stem 40 further upwardly after the shoulder 44 of the ICBV 11 is brought into contact with the shoulder 45 of the cap 46 to move upwardly, or bring to an open position, the ICV 7 acting as a unit with the cap 46 by the bolt 47. When the ICV 7 is brought to a fully open position, a shoulder 40d of the valve stem 40 is brought into contact with a shoulder 39e of the bush 39 in the packing 38 to achieve the effect of back seating, to thereby avoid leaking of the steam to atmosphere as is the case with the RSV 6.

The reheating steam flows downwardly between the valve seat 26 and the ICV 7 into the IP turbine 8, so that the steam turbine can be operated in a normal fashion.

The combined reheating steam valve according to the invention is constructed such that the RCV 6 and the ICV 7 can be fully opened and closed independently of each other without interfering with each other.

The provision of the RSV 6 on the upstream side of the ICV 7 and forming the outer peripheral surface of the RSV 6 in the cylindrical shape make it possible to obtain a reduced total length (height) in a combined reheating valve.

From the foregoing description, it will be appreciated that the combined reheating valve according to the invention is constructed such that the reheating stop valve is located on the upstream side of the intercepting valve and the main valve of the intercepting valve has a bypass valve built therein. By virtue of this construction, it is possible to positively start the steam turbine by ensuring that the steam necessary for startup is passed through the combined reheating valve in a volume essential to startup of the turbine.

Also, according to the invention, there is provided a combined reheating valve constructed such that the reheating stop valve is located on the upstream side of the intercepting valve and the reheating stop valve and the intercepting valve each have a bypass valve built therein. By virtue of this construction, it is possible to switch valve operation from the intercepting valve to the reheating stop valve and open the reheating stop valve without any limitations being placed thereon, in addition to positively starting the steam turbine by ensuring that the steam necessary for startup is passed through the combined reheating valve in a volume optimum for startup of the turbine.

Figure 5:
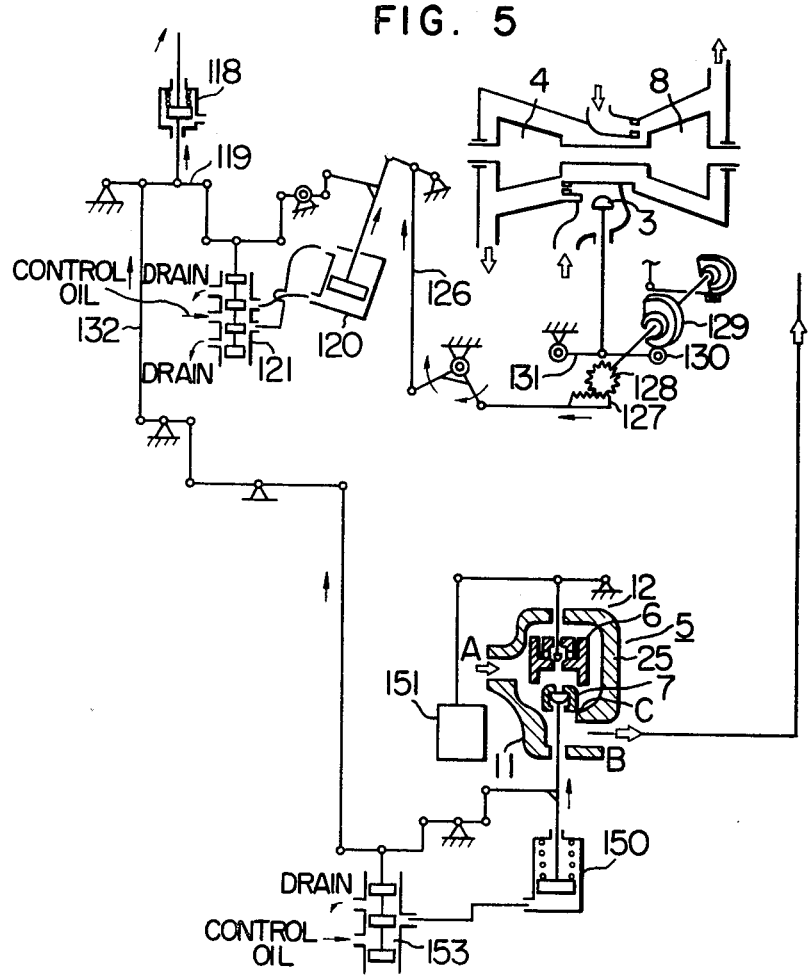
FIG. 5 is a schematic view of a mechanism for manipulating the combined reheating valve comprising another embodiment and the stream regulating valves.

Another embodiment will now be described. FIG. 5 shows a control mechanism for operating the combined reheating valve according to the invention. As shown, a steam regulating valve 3 for controlling the reheating steam introduced from an evaporator, not shown, of the boiler into the HP turbine 4 has its opening and closing operation controlled by a servomotor 120 provided with a control valve 121 and having a lever 119 connected thereto. The lever 119 has connected thereto a speed relay 118 for operating the lever 119 in accordance with a control signal, not shown, and has connected to one end a link 132 whose operation is controlled by the speed relay 118. The link 132 has connected thereto a control valve 153 which controls the operation of a hydraulic cylinder 150 for operating the ICV 7 of the combined reheating valve 5.

The ICBV 11 built-in the ICV 7 is connected through a valve stem to a piston of the hydraulic cylinder 150. The ICV 7 is intended to control reheating steam introduced into the IP turbine 8. In operation, actuation of the hydraulic cylinder 150 opens first the ICBV 11 and then the ICV 7. Meanwhile operation of the servomotor 120 is transmitted to the link 126 which successively actuates a rack 127, a pinion 128, a cam 129 and a roller 130, to thereby operate the steam regulating valve 3 through the lever 131 to control the volume of steam introduced into the HP turbine 4. In this way, the ICV 7 and the ICBV 11 are operated in conjunction with the steam regulating valve 3 by the speed relay 118. In the valve casing 25 of the combined reheating valve 5, the RSV 6 is located in opposed relation to the ICV 7. The RSV 6 has built therein bypass valve 12, so that the valves 6 and 12 have their opening and closing operation controlled by an RSV hydraulic cylinder 151.

Figure 6A:
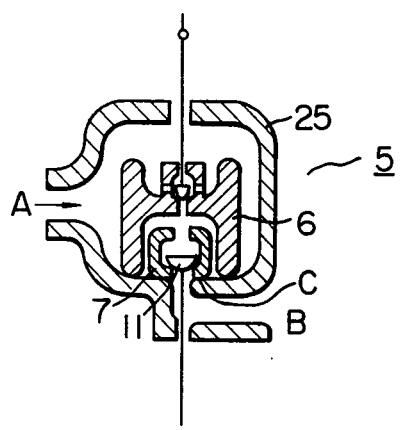
FIGS. 6a, 6b and 6c are views in explanation of the steps to be followed in bringing the combined reheating valve according to the invention to an open position.

Operation for controlling the combined reheating valve of the aforesaid construction will be described by referring to FIGS. 6a - 6c. In FIG. 6a, the valve is shown in a closed condition in which the RSV 6 is brought into contact with the valve seat of the valve casing 25 by the action of the RSV hydraulic cylinder 151 to close the steam passageway between a reheating steam inlet A and a reheating steam outlet B. The bypass valve 12 of the RSV 6 is in contact with the valve seat of the RSV 6 on the steam inlet side to thereby close the steam passageway. When the RSV 6 and the bypass valve 12 are in these conditions, no steam flows from the reheater 1b to the IP turbine 8 even if the ICV 7 is opened or closed. In FIG. 6a, the ICV 7 is also in contact with the valve seat C of the valve casing 25 and the ICBV 11 is in contact with the valve seat of the ICV 7 on the steam inlet side.

Figure 6B:
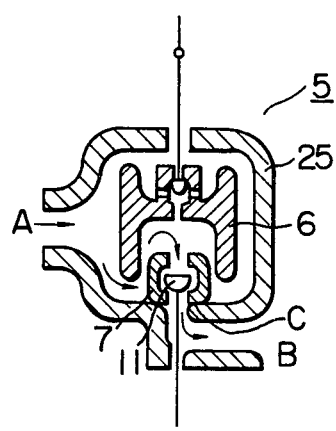

In FIG. 6b, the turbine is under a small load. More specifically, the RSV 6 is located in an upper position after the turbine is started. In this case, the ICV 7 remains in contact with the valve seat C of the valve casing 25, to thereby avoid leaking of the steam. As the ICBV 11 is slightly moved upwardly by the ICV hydraulic cylinder 150, a steam inlet and a steam outlet of the ICV 7 are brought into communication with each other. Thus the reheating steam flows from the reheating steam inlet A in the direction of an arrow and is discharged through the reheating steam outlet B. In this case, since the area of the opening of the steam passageway is small enough to effect control of the flow rate of the steam, the flow rate is controlled by the stroke of the ICBV 11.

Figure 6C:
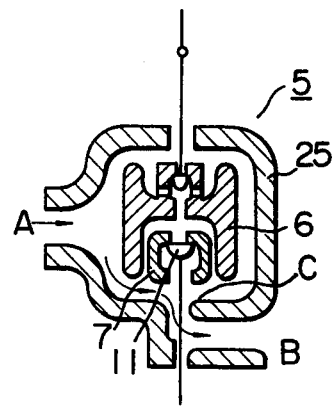

FIG. 6c shows the combined reheating valve 5 in a fully open condition. More specifically, the ICBV 11 is in contact with the valve seat of the ICV 7 on the steam inlet side and lifted, to thereby lift the ICV 7. Thus the ICV 7 is released from contact with the valve seat C of the valve casing 25, to thereby open the steam passageway. In this case, the reheating steam flows through the reheating steam inlet A and passes by the valve seat C of the valve casing 25 to the reheating steam outlet B as indicated by an arrow.

The position between the positions shown in FIGS. 6b and 6c is suitably selected by moving the ICBV 11 contacting the ICV 7.

From the foregoing description, it will be appreciated that the fine control of the flow rate of the steam effected by the ICBV 11 enables control of the volume of the steam to be smoothly effected at the time the operation speed of the turbine is increased.

Figure 7A:
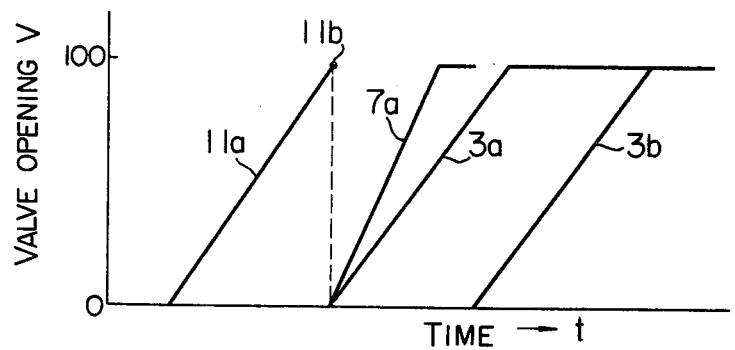
FIGS. 7a and 7b are characteristic views showing changes in the opening of the intercepting valve of the combined reheating valve according to the invention and the steam regulating valves and the flow rate of steam flowing through the intercepting valve of the combined reheating valve according to the invention and the steam regulating valves.
Figure 7B:
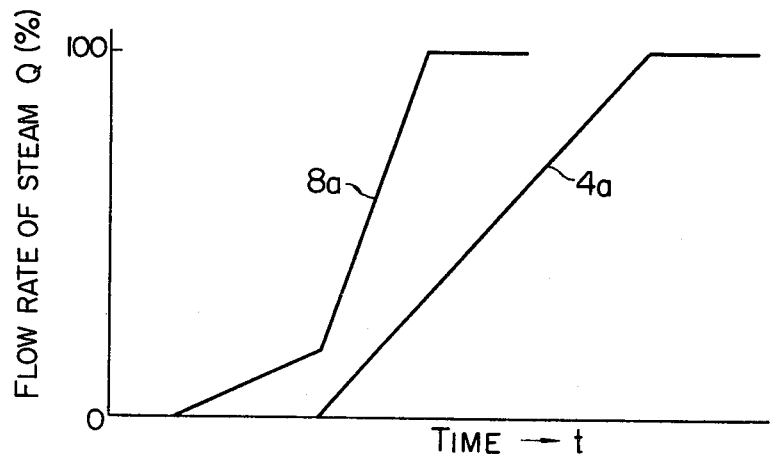

FIG. 7 shows the steam turbine starting time t in relation to the valve opening V of the ICV and the steam regulating valve and the steam flow rate Q flowing downwardly through these valves. In FIG. 7a, a straight line 11a represents a valve opening of the ICBV 11 and a point 11b indicate a fully open position of the ICBV 11. Thus the ICV 7 is not opened until point 11b is reached, and the flow rate of steam flowing into the IP turbine 8 is controlled by the ICBV 11 alone. After the ICBV 11 is brought to the fully open position, the ICV 7 is opened as indicated by a straight line 7a to control the flow rate of the steam. Straight lines 3a and 3b represent the opening of the steam regulating valves (which are two in number in this embodiment) 3 for controlling the flow rate of the steam introduced into the HP turbine 4. In FIG. 7b, a straight line 8a represents the flow rate of the steam flowing into the IP turbine 8 via the ICBV 11 or ICV 7 of the combined reheating valve. A straight line represents the flow rate of the steam flowing into the HP turbine 4 via the steam regulating valves 3. As can be clearly seen in FIG. 7, control of the flow rate of the steam introduced into the IP turbine 8 in low flow rate can be smoothly effected by the action of the ICBV 11.

The steam regulating valves 3 and the ICBV 11 can be readily operated in conjunction with each other due to the feature that they are both connected to the speed relay 118. Also, by altering the linkage connected to the speed relay 118, it is possible to readily change the relation between the flow rate of the steam introduced into the HP turbine 4 and that introduced into the IP turbine 8.

The flow rate of the steam can be controlled positively and with ease by opening and closing the ICV 7 by means of the ICBV 11.

The embodiments of the invention shown and described hereinabove are mechanically operated. However, the invention is not limited to the mechanically operated combined reheating valve and the combined reheating valve of the type which is electrically operated is also covered by the invention.

What is claimed is:

1. A combined steam valve in which a stop valve for blocking the flow of heated steam into a steam turbine and a control valve for controlling the flow rate of the heated steam supplied to the turbine are arranged in the same valve casing, wherein said stop valve is arranged upstream of the control valve with respect to the flow of the heated steam, a valve body constituting said control valve is provided with a bypass valve and a steam passageway for introducing the heated steam, which has passed through said bypass valve, into the steam turbine, and wherein a valve body of said bypass valve is attached to a valve stem for opening and closing said bypass valve relative to a bypass steam passageway formed through said control valve, and, on the valve body of said bypass valve and the valve body of said control valve, there are provided portions, respectively, which engage with each other to open said control valve when said valve stem is displaced in the direction for opening said bypass valve beyond a fully open position thereof, the control and bypass valves being operable for enabling the flow rate of the heated steam flowing through said steam passageway into the steam turbine to be proportional to the extent to which said bypass valve is opened, up to said fully open position, and thereafter in proportion to the extent that the control valve is opened, the bypass valve providing a fine control of the steam flow rate commensurate with the rate of increase of speed of the steam turbine during start-up, and the control valve providing a greater range of control upon opening after a desired turbine speed and load is achieved.

2. A combined valve according to claim 1, wherein a valve body of said stop valve is also provided with a bypass valve for reducing the pressure difference between the steam pressure on the upstream side of said stop valve relative to the steam pressure on the downstream side of said stop valve by opening of said bypass valve of the stop valve.

3. A combined valve according to claim 2, wherein the valve body of said stop valve is in the form of a cylinder in the shape of a letter H in vertical cross section, and said valve casing is formed with a cylindrical guide member fitted to the outer periphery of the valve body of said stop valve, said guide member being formed with apertures for allowing the heated steam to flow to the upstream side of the valve body of said stop valve.

4. A combined valve according to claim 2, wherein said stop valve is in the form of a cylinder, and said stop valve and said control valve are arranged in such a manner that the valve bodies of these two valves are opened and closed along a substantially common axis and said control valve is located inside said stop valve.

5. A combined valve as claimed in claim 1, wherein a speed relay means is interposed between a hydraulic servo means for opening and closing the control valve and a hydraulic servo means for opening and closing a steam regulating valve for controlling a heating steam introduced from a steam generator into a steam turbine of the high pressure side, said speed relay means being operative in response to a control signal to operate said two hydraulic servo means in conjunction with each other.

* * * * *